No. 756,571.  
Patented April 5, 1904.

UNITED STATES PATENT OFFICE.

RENÉ BOHN, OF MANNHEIM, GERMANY, ASSIGNOR TO BADISCHE ANILIN UND SODA FABRIK, OF LUDWIGSHAFEN-ON-THE-RHINE, GERMANY, A CORPORATION OF BADEN.

BLACK DYE AND PROCESS OF MAKING SAME.

SPECIFICATION forming part of Letters Patent No. 756,571, dated April 5, 1904.

Application filed February 6, 1903. Serial No. 142,211. (No specimens.)

*To all whom it may concern:*

Be it known that I, RENÉ BOHN, doctor of philosophy and chemist, a citizen of the Swiss Republic, residing at Mannheim, in the Grand Duchy of Baden, Germany, have invented new and useful Improvements in New Black Dye and Processes of Making Same, of which the following is a specification.

In the specification of British Letters Patent No. 3,828 of 1894 and the specification of Letters Patent No. 661,438, of November 6, 1900, there has been described the production of a naphthazarin intermediate product. In itself this intermediate product has not hitherto proved of use as a coloring-matter. I have now discovered that by treating this intermediate product with a thiosulfate, such as sodium thiosulfate, under suitable conditions—for example, in the presence of dilute mineral acid—coloring-matter can be obtained which possesses valuable properties. For the preparation of the new coloring-matter naphthazarin melts as obtained according to the aforesaid specifications can be advantageously employed.

The following example will serve to further illustrate the nature of my invention, which, however, is not confined to this example. The parts are by weight:

Example: Pour into a mixture of two hundred and fifty (250) parts of water and two hundred and fifty (250) parts of ice one hundred (100) parts of the melt such as can be obtained according to Example 1 of the specification of the said Letters Patent No. 661,438, of November 6, 1900. Filter the mixture so obtained and add to the filtrate, which contains the intermediate product in solution, a twenty (20) per cent. solution of sodium thiosulfate until no further precipitate separates out. For this purpose about two (2) parts of sodium thiosulfate are necessary. Stir for two (2) hours and filter off the precipitate obtained and wash it with cold water. The coloring-matter can be directly employed in paste form. It possesses the properties of a sulfo-acid of a leuco compound, becoming oxidized even by boiling with water in the presence of air and is possibly a thiosulfonic acid. The coloring-matter so obtained dyes unmordanted wool violet, which becomes green black on being subsequently treated on the fiber with potassium bichromate and acetic acid in the known manner. It dyes chrome mordanted wool bluer shades of black. On heating the coloring-matter with sodium bisulfite or with sodium sulfite a body soluble in water and yielding a brown solution is obtained, which body when printed on cotton with chromium acetate furnishes green-black shades.

The solution of the coloring-matter in water is violet. In dilute caustic-soda solution it dissolves with a green color, which in the presence of air becomes blue. Its solution in concentrated sulfuric acid containing ninety-six (96) per cent. of $H_2SO_4$ is red violet, and in glacial acetic acid it is difficulty soluble, yielding a violet solution.

I claim—

1. The manufacture of coloring-matter by treating the hereinbefore-defined naphthazarin intermediate product with a thiosulfate in presence of mineral acid.

2. The manufacture of coloring-matter by treating the hereinbefore-defined naphthazarin intermediate product with a thiosulfate in presence of sulfuric acid.

3. The new coloring-matter such as can be obtained from the naphthazarin intermediate product, which dissolves in water yielding a violet solution, whose solution in dilute caustic soda is green, becoming blue on exposure to air, whose solution in concentrated sulfuric acid is red violet, which dyes unmordanted wool violet, which shades become green black when treated on the fiber with potassium bichromate and acetic acid.

In testimony whereof I have hereunto set my hand in the presence of two subscribing witnesses.

RENÉ BOHN.

Witnesses:
JOHN L. HEINKE,
JACOB ADRIAN.